US008615049B2

(12) United States Patent
Wu et al.

(10) Patent No.: US 8,615,049 B2
(45) Date of Patent: Dec. 24, 2013

(54) METHOD AND APPARATUS FOR CONTROLLING CO-CHANNEL INTERFERENCE IN A WIRELESS COMMUNICATION SYSTEM (75) Inventors: Keying Wu, Shanghai (CN); Xiaolong Zhu, Shanghai (CN); Yang Song, Shanghai (CN)

(73) Assignee: Alcatel Lucent, Paris (FR)

( * ) Notice: Subject to any disclaimer, the term of this patent is extended or adjusted under 35 U.S.C. 154(b) by 107 days.

(21) Appl. No.: 13/258,708

(22) PCT Filed: Mar. 25, 2009

(86) PCT No.: PCT/CN2009/000312
§ 371 (c)(1),
(2), (4) Date: Sep. 22, 2011

(87) PCT Pub. No.: WO2010/108298
PCT Pub. Date: Sep. 30, 2010

(65) Prior Publication Data
US 2012/0014468 A1  Jan. 19, 2012

(51) Int. Cl.
*H04B 15/00* (2006.01)
*H04L 27/28* (2006.01)
(52) U.S. Cl.
USPC .......................................................... 375/260
(58) Field of Classification Search
None
See application file for complete search history.

(56) References Cited

U.S. PATENT DOCUMENTS

| 8,369,788 | B2* | 2/2013 | Kim et al. | 455/63.1 |
| 2006/0120477 | A1 | 6/2006 | Shen et al. | |
| 2007/0211813 | A1 | 9/2007 | Talwar et al. | |
| 2010/0309996 | A1* | 12/2010 | Lim et al. | 375/260 |
| 2010/0309998 | A1* | 12/2010 | Jung et al. | 375/260 |
| 2011/0028156 | A1* | 2/2011 | Zhu et al. | 455/450 |
| 2011/0034192 | A1* | 2/2011 | Lim et al. | 455/501 |
| 2012/0044830 | A1* | 2/2012 | Kim et al. | 370/252 |

FOREIGN PATENT DOCUMENTS

| CN | 101095296 A | 12/2007 |
| CN | 101291192 A | 10/2008 |
| CN | 101379724 A | 3/2009 |
| EP | 2033333 A | 3/2009 |
| EP | 2 182 663 A1 | 5/2010 |
| WO | WO 2008/002227 A1 | 1/2008 |
| WO | WO 2009/024018 | 2/2009 |

OTHER PUBLICATIONS

Supplementary European Search Report, Application No. EP 09 84 2035, Date Aug. 27, 2012; Date of Completion of Search Aug. 20, 2012, 7 pgs.
Yang Song et al., "Collaborative Mimo", IEEE Broadband Wireless Access Working Group Nov. 7, 2007, pp. 1-9, XP008136503.
International Search Report for PCT/CN2009/000312 dated Jan. 7, 2010.

* cited by examiner

*Primary Examiner* — Chieh M Fan
*Assistant Examiner* — Bahman Badipour
(74) *Attorney, Agent, or Firm* — Fay Sharpe LLP (57) ABSTRACT The present invention provides a method and an apparatus of controlling co-channel interference in a base station of a wireless communication system based on collaborative MIMO and the corresponding method and apparatus of assisting a serving base station to control co-channel interference in a mobile station of a wireless communication system based on collaborative MIMO. Since the feedback mechanism based on the codebook is employed in the collaborative MIMO system in the present invention to enable the BS to obtain the precoding information, the present invention can be used to the both TDD mode and FDD mode. Moreover, since the precoding vectors selected by the different mobile stations for a same BS are always orthogonal, multi-user co-channel interference can be reduced.

14 Claims, 4 Drawing Sheets

Base Station 2a

Base Station 2b

Mobile Station 1a

Mobile Station 1b

METHOD AND APPARATUS FOR CONTROLLING CO-CHANNEL INTERFERENCE IN A WIRELESS COMMUNICATION SYSTEM

FIELD OF THE INVENTION

The present invention relates to a wireless communication system, more particularly, to a wireless communication system based on collaborative MIMO (Co-MIMO).

BACKGROUND OF THE INVENTION

The next generation wireless communication systems aim for higher targets such as higher spectrum efficiency, better coverage and higher peak data rate, etc. However, these requirements have brought a great challenge, that is, inter-cell interference (ICI), which has become a severe obstacle to the performance improvement of wireless communication systems, especially for cell-edge users. In order to overcome ICI, many technologies have been proposed, but Co-MIMO has become one of the most promising technologies due to its capability to improve the cell-edge throughput and average sector throughput at the same time.

The basic idea of Co-MIMO is to perform joint MIMO transmission among multiple base stations (BS) and multiple mobile stations (MS). Each BS performs multi-user precoding to control co-channel interference (CCI). In order to perform effective precoding, each BS needs to know the channel state information (CSI) of the MSs that it serves.

In the Time Division Duplex (TDD) mode, the channel response information of the uplink and downlink is symmetric. Therefore, each base station can obtain the uplink channel responses from the MS to each BS according to the uplink from the MS and calculate the downlink information from each BS to the MS and the corresponding respective downlink precoding matrixes according to the uplink channel responses.

However, in the Frequency Division Duplex (FDD) mode, the frequency difference of carriers between the uplink and the downlink is generally greater than the coherent bandwidth of the channel, therefore the channel fading of the uplink and downlink is not related to each other, resulting in that each BS cannot determine its downlink channel information according to the uplink channel fading. Thus, each BS cannot determine corresponding respective downlink precoding matrixes. In a single BS MIMO system, the problem is solved through the codebook feedback. That is, a preset codebook is shared between the BS and the MS. The MS estimates the downlink channel according to the reference signal such as the downlink pilot signal and etc, and then selects a suitable codeword from the codebook as the precoding matrix and feedbacks the index of the codeword to the BS. The BS performs precoding by using the feedback of the MS. Since the working flowchart and mechanism of the single BS MIMO and Co-MIMO system are very different, it is very difficult to spread the present single BS precoding technology based on the codebook feedback directly to the Co-MIMO system. Nowadays, there is no effective methods which are capable to solve this problem in the prior art.

DETAILED DESCRIPTION OF THE INVENTION

In order to solve the drawbacks described above in the prior art, the present invention provides a method and an apparatus of controlling co-channel interference in a base station of a wireless communication system based on collaborative MIMO and the corresponding method and apparatus of assisting a serving base station to control co-channel interference in a mobile station of a wireless communication system based on collaborative MIMO.

According to the first aspect of the present invention, a method of controlling co-channel interference in a base station of a wireless communication system based on collaborative MIMO is provided, wherein the method comprises the steps of: a. sending a downlink reference signal to a served mobile station and at least one coordinating mobile station; b. receiving precoding information corresponding to a downlink signal from the base station to the served mobile station from the served mobile station; c. sending the received precoding information to at least one serving base station of the at least one coordinating mobile station; d. receiving at least one precoding information corresponding to at least one downlink signal from the base station to the at least one coordinating mobile station respectively forwarded by at least one serving base station of the at least one coordinating mobile stations from the at least one coordinating mobile station; e. precoding a downlink signal from the base station to the served mobile station based on the precoding information corresponding to a downlink signal from the base station to the served mobile station, and precoding the at least one downlink signal from the base station to the at least one coordinating mobile stations respectively based on the at least one precoding information corresponding to the at least one downlink signal from the base station to the at least one coordinating mobile stations; wherein, after step b and before step e, the method comprises the steps of: m. receiving at least one precoding information corresponding to at least one precoding information of at least one downlink signal from the at least one serving base stations to the at least one coordinating mobile stations respectively forwarded by at least one serving base station of the at least one coordinating mobile station from the at least one coordinating mobile station; n. sending the received at least one precoding information to the served mobile station; o. receiving at least one precoding information corresponding to at least one downlink signal from at least one serving base station of the at least one coordinating mobile station to the served mobile station; p. sending the received at least one precoding information to at least one serving base station of the at least one coordinating mobile station respectively.

According to the second aspect of the present invention, a method of assisting a serving base station to control co-channel interference in a mobile station of a wireless communication system based on collaborative MIMO is provided, wherein the method comprises the steps of: A. receiving a downlink reference signal from a serving base station and at least one downlink reference signal from at least one coordinating base station; B. according to the received downlink reference signal from the serving base station, estimating a channel transmission matrix of a downlink channel from the serving base station to the mobile station, and according to the received at least one downlink reference signal from the at least one coordinating base stations, estimating at least one channel transmission matrix of at least one downlink channel from the at least one coordinating base stations to the mobile station respectively; C. according to the estimated channel transmission matrix of a downlink channel from the serving base station to the mobile station, selecting a precoding vector corresponding to a downlink signal from the serving base station to the mobile station from a shared codebook; D. sending precoding information corresponding to a downlink signal from the serving base station to the mobile station to the serving base station; E. receiving at least one precoding information corresponding to at least one downlink signal from the at least one coordinating base station to at least one served mobile station of the at least one coordinating base station forwarded by the at least one coordinating base station and the serving base station from the at least one served mobile station from the at least one coordinating base station; F. based on the received at least one precoding information and the estimated at least one channel transmission matrix of at least one downlink channel from the at least one coordinating base station to the mobile station, selecting at least one precoding vector corresponding to at least one downlink signal from at least one coordinating base stations to the mobile station from the shared codebook respectively; wherein the precoding vector corresponding to a downlink signal from each coordinating base station to the mobile station is orthogonal with the precoding vector corresponding to a downlink signal from the coordinating base station to the served mobile station of the coordinating base station; G. sending at least one precoding information corresponding to at least one downlink signal from the at least one coordinating base station to the mobile station to the serving base station.

According to the third aspect of the present invention, a control apparatus of controlling co-channel interference in a base station of a wireless communication system based on collaborative MIMO is provided, wherein the apparatus comprises: a first sending means, for sending a downlink reference signal to a served mobile station and at least one coordinating mobile station; a first receiving means, for receiving precoding information corresponding to a downlink signal from the base station to the served mobile station from the served mobile station; a second sending means, for sending the received precoding information to at least one serving base station of the at least one coordinating mobile station; a second receiving means, for receiving at least one precoding information corresponding to at least one downlink signal from the base station to the at least one coordinating mobile station respectively forwarded by at least one serving base station of the at least one coordinating mobile stations from the at least one coordinating mobile station; a first precoding means, for precoding a downlink signal from the base station to the served mobile station based on the precoding information corresponding to a downlink signal from the base station to the served mobile station, and precoding the at least one downlink signal from the base station to the at least one coordinating mobile stations respectively based on the at least one precoding information corresponding to the at least one downlink signal from the base station to the at least one coordinating mobile stations; wherein, the control apparatus further includes: a third receiving means, for receiving at least one precoding information corresponding to at least one precoding information of at least one downlink signal from the at least one serving base stations to the at least one coordinating mobile stations respectively forwarded by at least one serving base station of the at least one coordinating mobile station from the at least one coordinating mobile station; a third sending means, for sending the received at least one precoding information to the served mobile station; a sixth receiving means, for receiving at least one precoding information corresponding to at least one downlink signal from at least one serving base station of the at least one coordinating mobile station to the served mobile station; a seventh receiving means, for sending the received at least one precoding information to at least one serving base station of the at least one coordinating mobile station respectively.

According to the fourth aspect of the present invention, an assist control apparatus of assisting a serving base station to control co-channel interference in a mobile station of a wireless communication system based on collaborative MIMO is provided, wherein the assist control apparatus comprises: a fourth receiving means, for receiving a downlink reference signal from a serving base station and at least one downlink reference signal from at least one coordinating base station; an estimating means, for according to the received downlink reference signal from the serving base station, estimating a channel transmission matrix of a downlink channel from the serving base station to the mobile station, and according to the received at least one downlink reference signal from the at least one coordinating base stations, estimating at least one channel transmission matrix of at least one downlink channel from the at least one coordinating base stations to the mobile station respectively; a first selecting means, for according to the estimated channel transmission matrix of a downlink channel from the serving base station to the mobile station, selecting a precoding vector corresponding to a downlink signal from the serving base station to the mobile station from a shared codebook; a fourth sending means, for sending precoding information corresponding to a downlink signal from the serving base station to the mobile station to the serving base station; a fifth receiving means, for receiving at least one precoding information corresponding to at least one downlink signal from the at least one coordinating base station to at least one served mobile station of the at least one coordinating base station forwarded by the at least one coordinating base station and the serving base station from the at least one served mobile station from the at least one coordinating base station; a second selecting means, for based on the received at least one precoding information and the estimated at least one channel transmission matrix of at least one downlink channel from the at least one coordinating base station to the mobile station, selecting at least one precoding vector corresponding to at least one downlink signal from at least one coordinating base stations to the mobile station from the shared codebook respectively; wherein the precoding vector corresponding to a downlink signal from each coordinating base station to the mobile station is orthogonal with the precoding vector corresponding to a downlink signal from the coordinating base station to the served mobile station of the coordinating base station; a fifth sending means, for sending at least one precoding information corresponding to at least one downlink signal from the at least one coordinating base station to the mobile station to the serving base station.

Since the feedback mechanism based on the codebook is employed in the Co-MIMO system in the present invention to enable the BS to obtain the precoding information, the present invention can be used to both TDD mode and FDD mode. Moreover, since the precoding vectors selected by different MSs for the same BS are always orthogonal, multi-user co-channel interference can be reduced.

DESCRIPTION OF DRAWINGS

With reference to the following description to the non-limited embodiments of the figures, other features, aims and advantages will be more apparent.

Wherein, through different figures above, same or similar reference numerals refer to corresponding features or functions.

DETAILED DESCRIPTION OF EMBODIMENTS

With reference to the figures, the present invention will be described in detail in the following.

Figure 1:
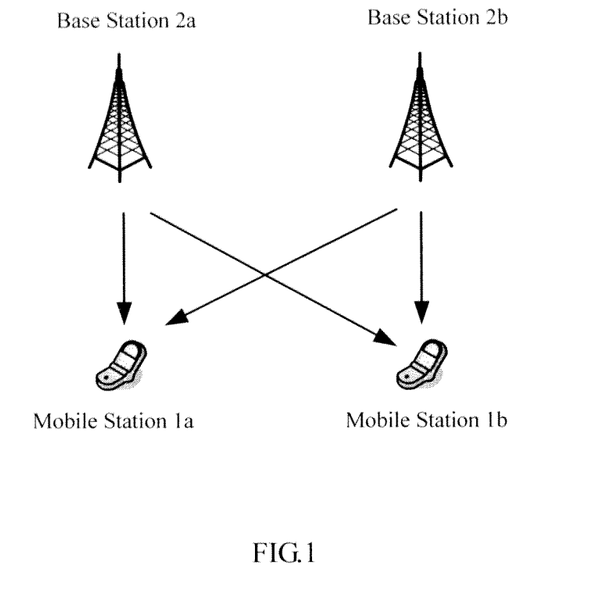
FIG. 1 shows a network schematic diagram of a wireless communication system based on the Co-MIMO according to a detailed embodiment of the present invention.

FIG. 1 shows a network schematic diagram of a wireless communication system based on the Co-MIMO according to a detailed embodiment of the present invention.

The wireless communication system shown in FIG. 1 includes MS 1a, MS 1b, BS 2a and BS 2b. It should be noted that the technical solution of the present invention will be described later by using an example in which a wireless communication system includes 2 BSs and 2 MSs, but those skilled in the art shall be appreciated that the wireless communication system of the present invention is not limited to 2 BSs and 2 MSs.

Moreover, without loss of generality, the present invention will be described later by using an example, in which both MS 1a and MS 1b include two receiving antennas, and both BS 2a and BS 2b include four transmitting antennas. It should be noted that in the specific application, BS 2a and BS 2b may include any number of transmitting antennas, MS 1a and MS 1b may include any number of receiving antennas, which will be understood by those skilled in the art and will not be described in detail here. But it should be noted that, in order to ensure MS 1a and MS 1b to restore the date stream received from BS 2a and BS 2b accurately, the number of the receiving antennas of MS 1a must be greater than or equal to the stream number of the data streams that are received from BS 2a and BS 2b by MS 1a. Similarly, the number of the receiving antennas of MS 1b must be greater than or equal to the stream number of the data streams that are received from BS 2a and BS 2b by MS 1b.

In the wireless communication system based on Co-MIMO shown in FIG. 1, it is assumed that, BS 2a sends one data stream to MS 1a and MS 1b respectively, and similarly, BS 2b also sends one data stream to MS 1a and MS 1b respectively.

For BS 2a, MS 1a is the served MS of BS 2a, and MS 1b is the coordinating MS of BS 2a. For BS 2b, MS 1b is the served MS of BS 2b, and MS 1a is the coordinating MS of BS 2b.

For MS 1a, BS 2a is the serving BS of MS 1a, and BS 2b is the coordinating BS of MS 1a. For MS 1b, BS 2b is the serving BS of MS 1b, and BS 2a is the coordinating BS of MS 1b.

Figure 2:
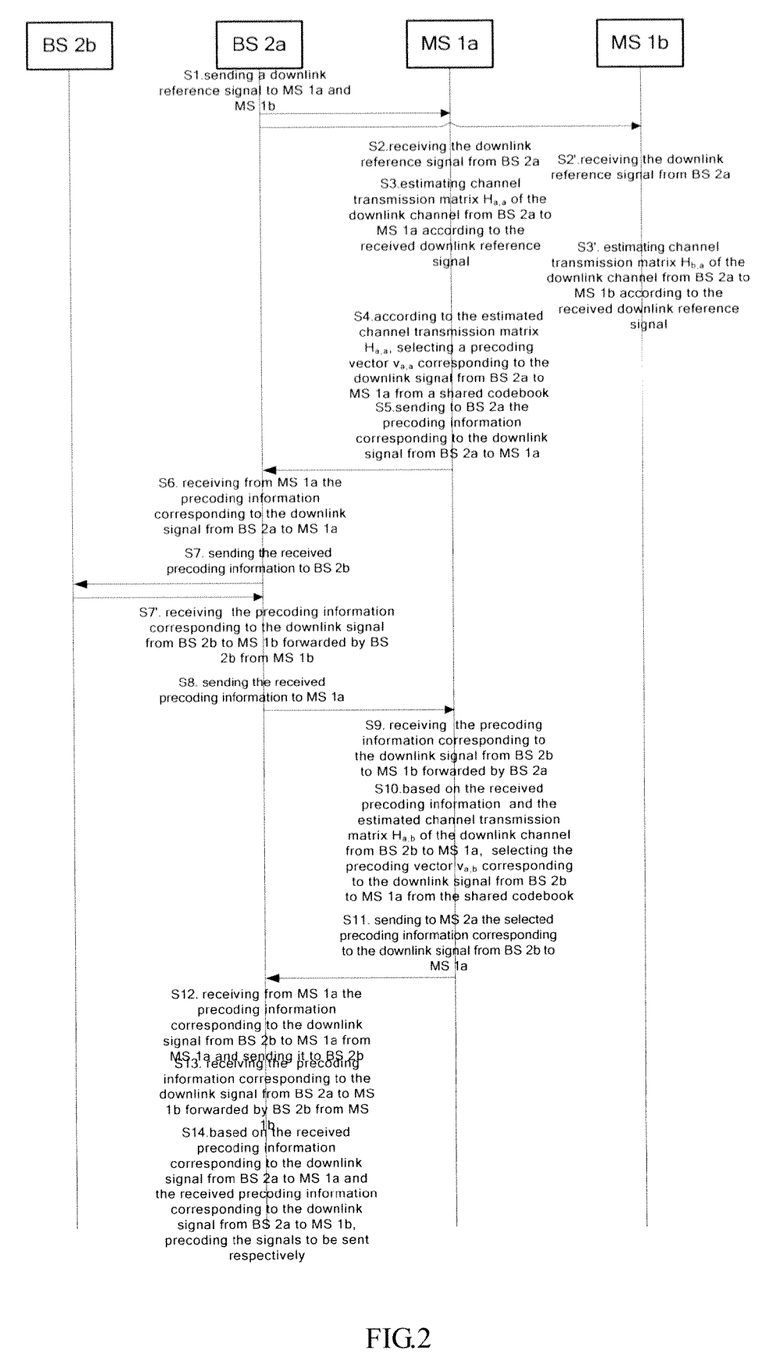
FIG. 2 shows a flowchart of the method of controlling the co-channel interference in a wireless communication system based on the Co-MIMO according to a detailed embodiment of the present invention.

FIG. 2 shows a flowchart of a method of controlling the co-channel interference in a wireless communication system based on the Co-MIMO according to a detailed embodiment of the present invention.

Referring to FIG. 2 and in conjunction with FIG. 1, the technical solution of the present invention will be described in detail. The description for FIG. 1 above will also be taken as a reference here.

Firstly, in step Si, BS 2a sends a downlink reference signal to MS 1a and MS 1b. The downlink reference signal can be a public pilot signal, or a training sequence.

Secondly, in step S2, MS 1a receives the downlink reference signal from BS 2a; in step S2', MS 1b receives the downlink reference signal from BS 2a.

It should be noted that, there is no necessary order between step S2 and S2'.

Then, in step S3, MS 1a estimates channel transmission matrix $H_{a,a}$ of the downlink channel from BS 2a to MS 1a according to the downlink reference signal received from BS 2a; in step S3', MS 1b estimates channel transmission matrix $H_{b,a}$ of the downlink channel from BS 2a to MS 1b according to the downlink reference signal received from BS 2a.

It should be noted that, there is no necessary order between step S3 and S3'.

After MS 1a estimates the channel transmission matrix $H_{a,a}$ of the downlink channel from BS 2a to MS 1a, in step S4, according to the estimated channel transmission matrix $H_{a,a}$, MS 1a selects a precoding vector $v_{a,a}$ corresponding to the downlink signal from BS 2a to MS 1a from a shared codebook.

Further, selecting a precoding vector $v_{a,a}$ from a shared codebook by MS 1a is based on the following formula:

$$v_{a,a} = \underset{c \in C}{\operatorname{argmax}} |H_{a,a} c|^2$$

Wherein, C represents codebook, the above formula represents that any column of vector c in the codebook C is traversed. The column of vector c which makes $|H_{a,a}c|^2$ reach the maximum value is the precoding vector $v_{a,a}$ corresponding to the downlink signal from BS 2a to MS 1a.

It should be noted, that MS 1a only needs to select a column of vector which meets the above formula from the shared codebook as the precoding vector for the data stream, since in the description the technical solution is described by using an example in which BS 2a sends one data stream to MS 1a. But those skilled in the art shall be appreciated that, if BS 2a sends a plurality of data streams to MS 1a, MS 1a must select a plurality of columns of vectors which meet the formula above from the shared codebook as the precoding vectors for the plurality of data streams.

Further, the shared codebook is shared among MS 1a, MS 1b, BS 2a and BS 2b. Still further, the codebook may be a DFT codebook, 3GPP LTE codebook, IEEE802.16e codebook, or other types of codebooks, which is intelligible for those skilled in the art and will not be described in detail here.

Typically, the codebook consists of a plurality of precoding matrixes; each matrix consists of a plurality of columns of vectors. Preferably, each column of precoding vectors in the same precoding matrix is orthogonal with each other.

Further, the number of rows of a precoding matrix is equal to the number of the BS transmitting antennas. The number of columns of a precoding matrix is equal to the maximum data stream number that can be sent by a BS. In the embodiment, since it is assumed that BS 2a and BS 2b include 4 transmitting antennas respectively and the maximum data stream number that can be sent by a BS is 4, a precoding matrix in the shared codebook is a 4×4 matrix.

After MS 1a selects the precoding vector $v_{a,a}$ corresponding to the downlink signal from BS 2a to MS 1a from the shared codebook, in step S5, MS 1a sends to BS 2a the precoding information corresponding to the downlink signal from BS 2a to MS 1a.

It should be noted that, MS 1a can send to BS 2a the precoding vector $v_{a,a}$ corresponding to the downlink signal from BS 2a to MS 1a directly. Preferably, MS 1a can send to BS 2a the index of the precoding vector $v_{a,a}$ corresponding to the downlink signal from BS 2a to MS 1a.

In the following, the example, in which MS 1a sends to BS 2a the index of the precoding vector $v_{a,a}$ corresponding to the downlink signal from BS 2a to MS 1a, will be described.

Next, in step S6, BS 2a receives from MS 1a the index of the precoding vector $v_{a,a}$ corresponding to the downlink signal from BS 2a to MS 1a. Then, in step S7, BS 2a sends to BS 2b the received index of the precoding $v_{a,a}$ corresponding to the downlink signal from BS 2a to MS 1a.

Above is described from the view point of BS 2a, but it is intelligible to those skilled in the art, BS 2b also interacts with MS 1b and MS 1a, while BS 2a interacts with MS 1a and MS 1b.

More specifically, firstly, BS 2b sends a downlink reference signal to MS 1b and MS 1a. The downlink reference signal can be a public pilot signal, or a training sequence.

Secondly, MS 1b receives the downlink reference signal from BS 2b; in step S2', MS 1a receives the downlink reference signal from BS 2b.

Similarly, there is no necessary order between the step of MS 1b receiving the downlink reference signal from BS 2b and the step of MS 1a receiving the downlink reference signal from BS 2b.

Then, MS 1b estimates channel transmission matrix $H_{b,b}$ of the downlink channel from BS 2b to MS 1b according to the downlink reference signal received from BS 2b; MS 1a estimates channel transmission matrix $H_{a,b}$ of the downlink channel from BS 2b to MS 1a according to the downlink reference signal received from BS 2b.

Next, according to the estimated channel transmission matrix $H_{b,b}$, MS 1b selects a precoding vector $v_{b,b}$ corresponding to the downlink signal from BS 2b to MS 1b from a shared codebook.

Further, selecting a precoding vector $v_{b,b}$ from a shared codebook by MS 1b is based on the following formula:

$$v_{b,b} = \underset{c \in C}{\operatorname{argmax}} |H_{b,b} c|^2$$

Wherein, C represents codebook, the above formula represents that any column of vector c in the codebook C is traversed. The column of vector c which makes $|H_{b,b}c|^2$ reach the maximum value is the precoding vector $v_{b,b}$ corresponding to the downlink signal from BS 2b to MS 1b.

Then, MS 1b sends to BS 2b the precoding information corresponding to the downlink signal from BS 2b to MS 1b.

It should be noted that, MS 1b can send to BS 2b the precoding vector $v_{b,b}$ corresponding to the downlink signal from BS 2b to MS 1b directly. Preferably, MS 1b can send to BS 2b the index of the precoding vector $v_{b,b}$ corresponding to the downlink signal from BS 2b to MS 1b.

In the following, the example, in which MS 1b sends to BS 2b the index of the precoding vector $v_{b,b}$ corresponding to the downlink signal from BS 2b to MS 1b, will be described.

After BS 2b receives from MS 1b the index of the precoding vector $v_{b,b}$ corresponding to the downlink signal from BS 2b to MS 1b, it sends the index of the precoding vector $v_{b,b}$ to BS 2a.

In step S7', BS 2a receives the index of the precoding vector $v_{b,b}$ corresponding to the downlink signal from BS 2b to MS 1b forwarded by BS 2b from MS 1b. Then, in step S8, BS 2a sends the received index of the precoding vector $v_{b,b}$ to MS 1a.

It should be noted that, there is no order between step S7 and step S7' above.

Next, in step S9, MS 1a receives the index of the precoding vector $v_{b,b}$ corresponding to the downlink signal from BS 2b to MS 1b forwarded by BS 2a, then, in step S10, based on the received index of the precoding vector $v_{b,b}$ corresponding to the downlink signal from BS 2b to MS 1b and the estimated channel transmission matrix $H_{a,b}$ of the downlink channel from BS 2b to MS 1a, MS 1a selects the precoding vector $v_{a,b}$ corresponding to the downlink signal from BS 2b to MS 1a from the shared codebook.

More specifically, firstly according to the received index of the precoding vector $v_{b,b}$ corresponding to the downlink signal from BS 2b to MS 1b, MS 1a searches the corresponding precoding vector $v_{b,b}$ from the shared codebook. Then according to the precoding vector $v_{b,b}$ corresponding to the downlink signal from BS 2b to MS 1b and the estimated channel transmission matrix $H_{a,b}$ of the downlink channel from BS 2b to MS 1a, MS 1a selects the precoding vector $v_{a,b}$ corresponding to the downlink signal from BS 2b to MS 1a from the codebook.

Wherein, the selected precoding vector $v_{a,b}$ corresponding to the downlink signal from BS 2b to MS 1a from the shared codebook should be orthogonal with the selected precoding vector $v_{b,b}$ corresponding to the downlink signal from BS 2b to MS 1b.

Since each column of the precoding vectors in each precoding matrix in the shared codebook is orthogonal with each other, preferably, according to the estimated channel transmission matrix $H_{a,b}$ of the downlink channel from BS 2b to MS 1a, MS 1a selects the precoding vector $v_{a,b}$ corresponding to the downlink signal from BS 2b to MS 1a from the precoding matrix where the precoding vector $v_{b,b}$ corresponding to the downlink signal from BS 2b to MS 1b is located.

Further, selecting a precoding vector $v_{a,b}$ from a shared codebook by MS 1a is based on the following formula:

$$v_{a,b} = \underset{\substack{c \in C \\ v_{b,b} \cdot c' = 0}}{\operatorname{argmax}} |H_{a,b} c|^2$$

Wherein, C represents codebook, c' represents the conjugate transposed matrix of c. The above formula represents that any column of precoding vector in the precoding matrix, where the precoding vector $v_{b,b}$ is located, in the codebook C, is traversed. The column of vector c which makes $|H_{a,b}c|^2$ reach the maximum value is the precoding vector $v_{a,b}$ corresponding to the downlink signal from BS 2b to MS 1a.

After MS 1a selects the precoding vector $v_{a,b}$ corresponding to the downlink signal from BS 2b to MS 1a from the shared codebook, in step S11, MS 1a sends the index of the selected precoding vector $v_{a,b}$ to BS 2a.

Of course, MS 1a can also send the precoding vector $v_{a,b}$ to BS 2a directly.

step S12, BS 2a receives from MS 1a the index of the precoding vector $v_{a,b}$ corresponding to the downlink signal from BS 2b to MS 1a and sends it to BS 2b.

In the meantime when MS 1a selects the precoding vector $v_{a,b}$ corresponding to the downlink signal from BS 2b to MS 1a from the shared codebook, MS 1b also selects the precoding vector $v_{b,a}$ corresponding to the downlink signal from BS 2a to MS 1b from the shared codebook.

More specifically, in step S7 above, after BS 2a sends to BS 2b the received index of the precoding $v_{a,a}$ corresponding to the downlink signal from BS 2a to MS 1a, BS 2b receives the index of the precoding vector $v_{a,a}$ corresponding to the downlink signal from BS 2a to MS 1a forwarded by BS 2a from MS 1a and sends the index of the precoding vector $v_{a,a}$ to MS 1b.

After MS 1b receives the index of the precoding vector $v_{a,a}$, based on the index of the precoding vector $v_{a,a}$ and the estimated channel transmission matrix $H_{b,a}$ of the downlink channel from BS 2a to MS 1b, MS 1b selects the precoding vector $v_{b,a}$ corresponding to the downlink signal from BS 2a to MS 1b from the shared codebook.

More specifically, firstly according to the received index of the precoding vector $v_{a,a}$ corresponding to the downlink signal from BS 2a to MS 1a, MS 1b searches the corresponding precoding vector $v_{a,a}$ from the shared codebook. Then according to the precoding vector $v_{a,a}$ corresponding to the downlink signal from BS 2a to MS 1a and the estimated channel transmission matrix $H_{b,a}$ of the downlink channel from BS 2a to MS 1b, MS 1a selects the precoding vector $v_{b,a}$ corresponding to the downlink signal from BS 2a to MS 1b from the codebook.

Wherein, the selected precoding vector $v_{b,a}$ corresponding to the downlink signal from BS 2a to MS 1b from the shared codebook should be orthogonal with the selected precoding vector $v_{a,a}$ corresponding to the downlink signal from BS 2a to MS 1a.

Since each column of the precoding vectors in each precoding matrix in the shared codebook is orthogonal with each other, preferably, according to the estimated channel transmission matrix $H_{b,a}$ of the downlink channel from BS 2a to MS 1b, MS 1b selects the precoding vector $v_{b,a}$ corresponding to the downlink signal from BS 2a to MS 1b from the precoding matrix where the precoding vector $v_{a,a}$ corresponding to the downlink signal from BS 2a to MS 1a is located.

Further, selecting a precoding vector $v_{b,a}$ from a shared codebook by MS 1b is based on the following formula:

$$v_{b,a} = \underset{\substack{c \in C \\ v_{a,a} \cdot c' = 0}}{\operatorname{argmax}} |H_{b,a} c|^2$$

Wherein, C represents codebook, c' represents the conjugate transposed matrix of c. The above formula represents that any column of precoding vector in the precoding matrix, where the precoding vector $v_{a,a}$ is located, in the codebook C, is traversed. The column of vector c which makes $|H_{b,a}c|^2$ reach the maximum value is the precoding vector $v_{b,a}$ corresponding to the downlink signal from BS 2a to MS 1b.

After MS 1b selects the precoding vector $v_{b,a}$ corresponding to the downlink signal from BS 2a to MS 1b from the shared codebook, MS 1b sends the index of the selected precoding vector $v_{b,a}$ to BS 2b.

Of course, MS 1b can also send the precoding vector $v_{b,a}$ to BS 2b directly.

After BS 2b receives from MS 1b the index of the precoding vector $v_{b,a}$ corresponding to the downlink signal from BS 2a to MS 1b, BS 2b sends it to BS 2a.

In step S13, BS 2a receives the index of the precoding vector $V_{b,a}$ corresponding to the downlink signal from BS 2a to MS 1b forwarded by BS 2b from MS 1b.

Next, in step S14, based on the received index of the precoding vector $v_{b,a}$ corresponding to the downlink signal from BS 2a to MS 1b and the index of the precoding vector $v_{a,a}$ corresponding to the downlink signal from BS 2a to MS 1a, BS 2a precodes the downlink signals sent to MS 1a and MS 1b respectively.

More specifically, firstly, according to the received index of the precoding vector $v_{a,a}$ corresponding to the downlink signal from BS 2a to MS 1a, BS 2a searches the corresponding precoding vector $v_{a,a}$ from the shared codebook, and according to the received index of the precoding vector $v_{b,a}$ corresponding to the downlink signal from BS 2a to MS 1b, BS 2a searches the corresponding precoding vector $v_{b,a}$ from the shared codebook.

Then, according to the searched precoding vector $v_{a,a}$, BS 2a precodes the downlink signal which is sent by BS 2a to MS 1a, and according to the searched precoding vector $v_{b,a}$, BS 2a precodes the downlink signal which is sent by BS 2a to MS 1b.

At last, BS 2a sends the precoded downlink signals to MS 1a and MS 1b respectively.

Similarly, after BS 2b receives the index of the precoding vector $v_{a,b}$ corresponding to the downlink signal from BS 2b to MS 1a forwarded by BS 2a from MS 1a, based on the received index of the precoding vector $v_{b,a}$ corresponding to the downlink signal from BS 2a to MS 1b and the index of the precoding vector $v_{b,b}$ corresponding to the downlink signal from BS 2b to MS 1b, BS 2b precodes the downlink signals sent to MS 1b and MS 1a respectively.

More specifically, firstly, according to the received index of the precoding vector $v_{b,b}$ corresponding to the downlink signal from BS 2b to MS 1b, BS 2b searches the corresponding precoding vector $v_{b,b}$ from the shared codebook, and according to the received index of the precoding vector $v_{a,b}$ corresponding to the downlink signal from BS 2b to MS 1a, BS 2b searches the corresponding precoding vector $v_{a,b}$ from the shared codebook.

Then, according to the searched precoding vector $v_{b,b}$, BS 2b precodes the downlink signal which is sent by BS 2b to MS 1b, and according to the searched precoding vector $v_{a,b}$, BS 2b precodes the downlink signal which is sent by BS 2b to MS 1a.

At last, BS 2b sends the precoded downlink signals to MS 1b and MS 1a respectively.

The technical solution of the present invention is described above from the view point of the method. In the following, the technical solution of the present invention will be described from the view point of the apparatus module.

Figure 3:
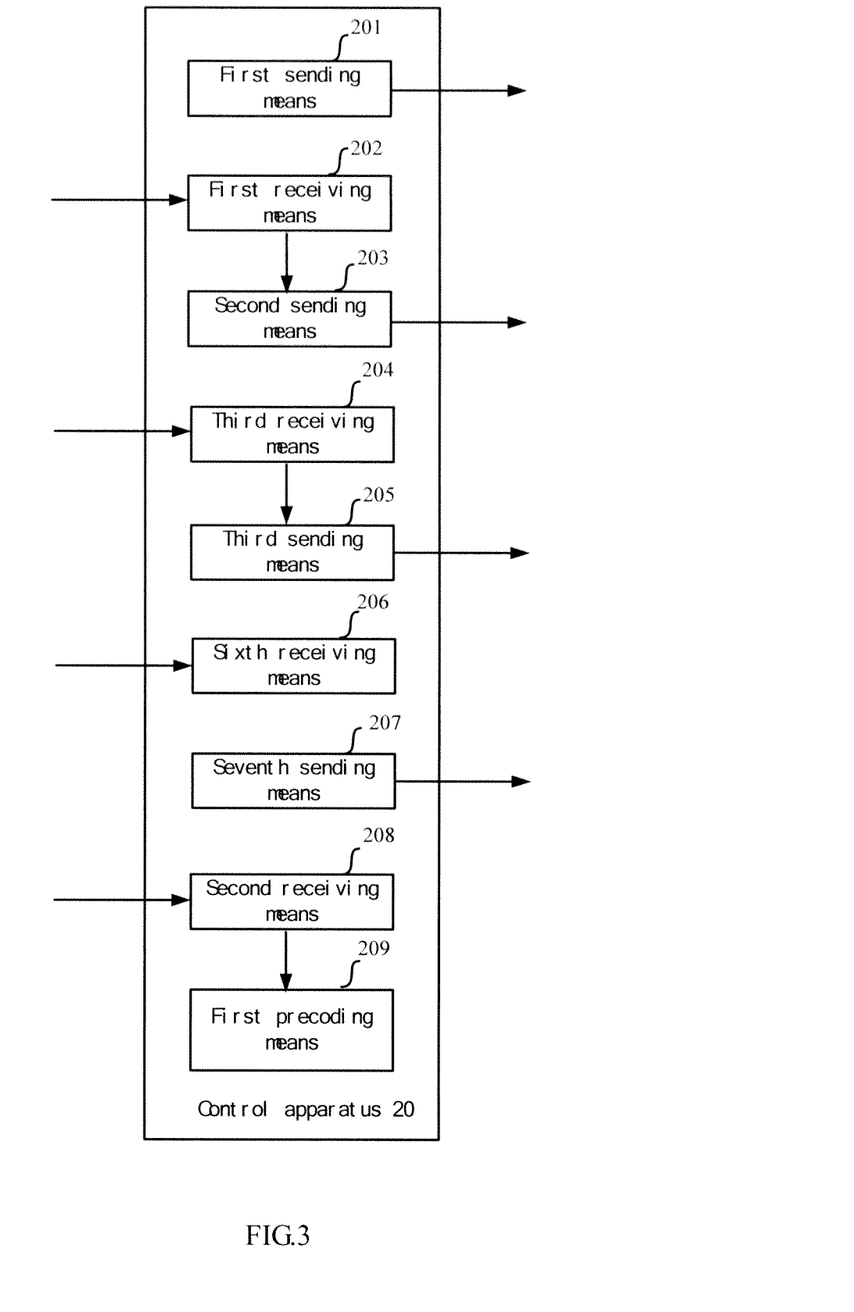
FIG. 3 shows a block diagram of a control apparatus in a BS of a wireless communication system based on the Co-MIMO for controlling the co-channel interference according to a detailed embodiment of the present invention.

FIG. 3 shows a block diagram of a control apparatus in a BS of a wireless communication system based on the Co-MIMO for controlling the co-channel interference according to a detailed embodiment of the present invention. The control apparatus 20 in FIG. 3 includes a first sending means 201, a first receiving means 202, a second sending means 203, a third receiving means 204, a third sending means 205, a sixth receiving means 206, a seventh sending means 207, a second receiving means 208 and a first precoding means 209.

Figure 4:
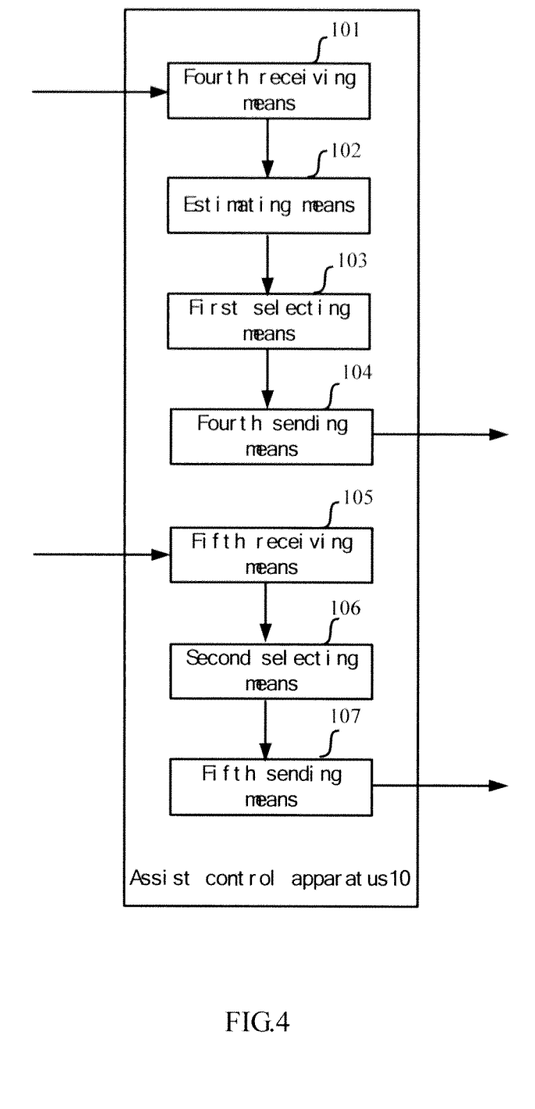
FIG. 4 shows a block diagram of an assist control apparatus in a MS of a wireless communication system based on the Co-MIMO for controlling the co-channel interference according to a detailed embodiment of the present invention.

FIG. 4 shows a block diagram of an assist control apparatus in a MS of a wireless communication system based on the Co-MIMO for controlling the co-channel interference according to a detailed embodiment of the present invention. The assist control apparatus 10 in FIG. 4 includes a fourth receiving means 101, an estimating means 102, a first selecting means 103, a fourth sending means 104, a fifth receiving means 105, a second selecting means 106 and a fifth sending means 107.

Hereinafter, referring to FIG. 3 and FIG. 4 and in conjunction with FIG. 1, the technical solution of the present invention will be described in detail. The description for FIG. 1 above will also be taken as a reference here.

Firstly, the first sending means 201 in the control apparatus 20 in BS 2a sends a downlink reference signal to MS 1a and MS 1b. The downlink reference signal can be a public pilot signal, or a training sequence.

Secondly, the fourth receiving means 101 in the assist control apparatus 10 in MS 1a receives the downlink reference signal from BS 2a; the fourth receiving means 101 in the assist control apparatus 10 in MS 1b receives the downlink reference signal from BS 2a.

Then, the estimating means 102 in the assist control apparatus 10 in MS 1a estimates channel transmission matrix $H_{a,a}$ of the downlink channel from BS 2a to MS 1a according to the downlink reference signal received from BS 2a; the estimating means 102 in the assist control apparatus 10 in MS 1b estimates channel transmission matrix $H_{b,a}$ of the downlink channel from BS 2a to MS 1b according to the downlink reference signal received from BS 2a.

After the estimating means 102 in the assist control apparatus 10 in MS 1a estimates the channel transmission matrix $H_{a,a}$ of the downlink channel from BS 2a to MS 1a, according to the estimated channel transmission matrix $H_{a,a}$, the first selecting means 103 in the assist control apparatus 10 in MS 1a selects a precoding vector $v_{a,a}$ corresponding to the downlink signal from BS 2a to MS 1a from a shared codebook.

Further, selecting a precoding vector $v_{a,a}$ from a shared codebook by the selecting means 103 in the assist control apparatus 10 in MS 1a is based on the following formula:

$$v_{a,a} = \underset{c \in C}{\operatorname{argmax}} |H_{a,a}c|^2$$

Wherein, C represents codebook, the above formula represents that any column of vector c in the codebook C is traversed. The column of vector c which makes $|H_{a,a}c|^2$ reach the maximum value is the precoding vector $v_{a,a}$ corresponding to the downlink signal from BS 2a to MS 1a.

It should be noted, that MS 1a only needs to select a column of vector which meets the above formula from the shared codebook as the precoding vector for the data stream, since in the description the technical solution is described by using an example in which BS 2a sends one data stream to MS 1a. But those skilled in the art shall be appreciated that, if BS 2a sends a plurality of data streams to MS 1a, MS 1a must select a plurality of columns of vectors which meet the formula above from the shared codebook as the precoding vectors for the plurality of data streams.

Further, the shared codebook is shared among MS 1a, MS 1b, BS 2a and BS 2b. Still further, the codebook may be a DFT codebook, 3GPP LTE codebook, IEEE802.16e codebook, or other types of codebooks, which is intelligible for those skilled in the art and will not be described in detail here.

Typically, the codebook consists of a plurality of precoding matrixes; each matrix consists of a plurality of columns of vectors. Preferably, each column of precoding vectors in the same precoding matrix is orthogonal with each other.

Further, the number of rows of a precoding matrix is equal to the number of the BS transmitting antennas. The number of columns of a precoding matrix is equal to the maximum data stream number that can be sent by a BS. In the embodiment, since it is assumed that BS 2a and BS 2b include 4 transmitting antennas respectively and the maximum data stream number that can be sent by a BS is 4, a precoding matrix in the shared codebook is a 4×4 matrix.

After the first selecting means 103 in the assist control apparatus 10 in MS 1a selects the precoding vector $v_{a,a}$ corresponding to the downlink signal from BS 2a to MS 1a from the shared codebook, the fourth sending means 104 in the assist control apparatus 10 in MS 1a sends to BS 2a the precoding information corresponding to the downlink signal from BS 2a to MS 1a.

It should be noted that, the fourth sending means 104 in the assist control apparatus 10 in MS 1a can send to BS 2a the precoding vector $v_{a,a}$ corresponding to the downlink signal from BS 2a to MS 1a directly. Preferably, the fourth sending means 104 in the assist control apparatus 10 in MS 1a can send to BS 2a the index of the precoding vector $v_{a,a}$ corresponding to the downlink signal from BS 2a to MS 1a.

Further, the determining means in the fourth sending means 104 firstly determines the index of the precoding vector $v_{a,a}$ according to the precoding vector $v_{a,a}$ corresponding to the downlink signal from BS 2a to MS 1a. Then, the sixth sending means in the fourth sending means 104 sends to BS 2a the determined index of the precoding vector $v_{a,a}$ corresponding to the downlink signal from BS 2a to MS 1a.

In the following, the example, in which the fourth sending means 104 in the assist control apparatus 10 in MS 1a sends to BS 2a the index of the precoding vector $v_{a,a}$ corresponding to the downlink signal from BS 2a to MS 1a, will be described.

Next, the first receiving means 202 in the control apparatus 20 in BS 2a receives from MS 1a the index of the precoding vector $v_{a,a}$ corresponding to the downlink signal from BS 2a to MS 1a. Then, the second sending means 203 in the control apparatus 20 in BS 2a sends to BS 2b the received index of the precoding $v_{a,a}$ corresponding to the downlink signal from BS 2a to MS 1a.

Above is described from the view point of BS 2a, but it is intelligible to those skilled in the art, BS 2b also interacts with MS 1b and MS 1a, while BS 2a interacts with MS 1a and MS 1b.

More specifically, firstly, the first sending means 201 in the control apparatus 20 in BS 2b sends a downlink reference signal to MS 1b and MS 1a. The downlink reference signal can be a public pilot signal, or a training sequence.

Secondly, the fourth receiving means 101 in the assist control apparatus 10 in MS 1b receives the downlink reference signal from BS 2b; the fourth receiving means 101 in the assist control apparatus 10 in MS 1a receives the downlink reference signal from BS 2b.

Then, the estimating means 102 in the assist control apparatus 10 in MS 1b estimates channel transmission matrix $H_{b,b}$ of the downlink channel from BS 2b to MS 1b according to the downlink reference signal received from BS 2b; the estimating means 102 in the assist control apparatus 10 in MS 1a estimates channel transmission matrix $H_{a,b}$ of the downlink channel from BS 2b to MS 1a according to the downlink reference signal received from BS 2b.

Next, according to the estimated channel transmission matrix $H_{b,b}$, the first selecting means 103 in the assist control apparatus 10 in MS 1b selects a precoding vector $v_{b,b}$ corresponding to the downlink signal from BS 2b MS 1b from a shared codebook.

Further, selecting a precoding vector $v_{b,b}$ from a shared codebook by the first selecting means 103 in the assist control apparatus 10 in MS 1b is based on the following formula:

$$v_{b,b} = \underset{c \in C}{\operatorname{argmax}} |H_{b,b}c|^2$$

Wherein, C represents codebook, the above formula represents that any column of vector c in the codebook C is traversed. The column of vector c which makes $|H_{b,b}c|^2$ reach the maximum value is the precoding vector $v_{b,b}$ corresponding to the downlink signal from BS 2b to MS 1b.

Then, the fourth sending means 104 in the assist control apparatus 10 in MS 1b sends to BS 2b the precoding information corresponding to the downlink signal from BS 2b to MS 1b.

It should be noted that, the fourth sending means 104 in the assist control apparatus 10 in MS 1b can send to BS 2b the precoding vector $v_{b,b}$ corresponding to the downlink signal from BS 2b to MS 1b directly. Preferably, the fourth sending means 104 in the assist control apparatus 10 in MS 1b can send to BS 2b the index of the precoding vector $v_{b,b}$ corresponding to the downlink signal from BS 2b to MS 1b.

Further, the determining means in the fourth sending means 104 firstly determines the index of the precoding vector $v_{b,b}$ according to the precoding vector $v_{b,b}$ corresponding to the downlink signal from BS 2b to MS 1b. Then, the sixth sending means in the fourth sending means 104 sends to BS 2b the determined index of the precoding vector $v_{b,b}$ corresponding to the downlink signal from BS 2b to MS 1b.

In the following, the example, in which the fourth sending means 104 in the assist apparatus means 10 in MS 1b sends to BS 2b the index of the precoding vector $v_{b,b}$ corresponding to the downlink signal from BS 2b to MS 1b, will be described.

After the first receiving means 202 in the control apparatus 20 in BS 2b receives from MS 1b the index of the precoding vector $v_{b,b}$ corresponding to the downlink signal from BS 2b to MS 1b, the second sending means 203 in the control apparatus 20 in BS 2b sends the index of the precoding vector $v_{b,b}$ to BS 2a.

The third receiving means 204 in the control apparatus 20 in BS 2a receives the index of the precoding vector $v_{b,b}$ corresponding to the downlink signal from BS 2b to MS 1b forwarded by BS 2b from MS 1b. Then, the third sending means 205 in the control apparatus 20 in BS 2a sends the received index of the precoding vector $v_{b,b}$ to MS 1a.

Next, the fifth receiving means 105 in the assist control apparatus 10 in MS 1a receives the index of the precoding vector $v_{b,b}$ corresponding to the downlink signal from BS 2b to MS 1b forwarded by BS 2a, then, based on the received index of the precoding vector $v_{b,b}$ corresponding to the downlink signal from BS 2b to MS 1b and the estimated channel transmission matrix $H_{a,b}$ of the downlink channel from BS 2b to MS 1a, the second selecting means 106 in the assist control apparatus 10 in MS 1a selects the precoding vector $v_{a,b}$ corresponding to the downlink signal from BS 2b to MS 1a from the shared codebook.

More specifically, firstly according to the received index of the precoding vector $v_{b,b}$ corresponding to the downlink signal from BS 2b to MS 1b, the second searching means in the second selecting means 106 in MS 1a searches the corresponding precoding vector $v_{b,b}$ from the shared codebook. Then according to the precoding vector $v_{b,b}$ corresponding to the downlink signal from BS 2b to MS 1b and the estimated channel transmission matrix $H_{a,b}$ of the downlink channel from BS 2b to MS 1a, the third selecting means in the second selecting means 106 selects the precoding vector $v_{a,b}$ corresponding to the downlink signal from BS 2b to MS 1a from the codebook.

Wherein, the selected precoding vector $v_{a,b}$ corresponding to the downlink signal from BS 2b to MS 1a from the shared codebook should be orthogonal with the selected precoding vector $v_{b,b}$ corresponding to the downlink signal from BS 2b to MS 1b.

Since each column of the precoding vectors in each precoding matrix in the shared codebook is orthogonal with each other, preferably, according to the estimated channel transmission matrix $H_{a,b}$ of the downlink channel from BS 2b to MS 1a, the second selecting means 106 in the assist control means 10 in MS 1a selects the precoding vector $v_{a,b}$ corresponding to the downlink signal from BS 2b to MS 1a from the precoding matrix where the precoding vector $v_{b,b}$ corresponding to the downlink signal from BS 2b to MS 1b is located.

Further, selecting a precoding vector $v_{a,b}$ from a shared codebook by the second selecting means 106 in the assist control apparatus 10 in MS 1a is based on the following formula:

$$v_{a,b} = \underset{\substack{c \in C \\ v_{b,b} \cdot c' = 0}}{\operatorname{argmax}} |H_{a,b}c|^2$$

Wherein, C represents codebook, c' represents the conjugate transposed matrix of c. The above formula represents that any column of precoding vector in the precoding matrix, where the precoding vector $v_{b,b}$ is located, in the codebook C, is traversed. The column of vector c which makes $|H_{a,b}c|^2$ reach the maximum value is the precoding vector $v_{a,b}$ corresponding to the downlink signal from BS 2b to MS 1a.

After the second selecting means 106 in the assist control apparatus 10 in MS 1a selects the precoding vector $v_{a,b}$ corresponding to the downlink signal from BS 2b to MS 1a from the shared codebook, the fifth sending means 107 in the assist control apparatus 10 in MS 1a sends the index of the selected precoding vector $v_{a,b}$ to BS 2a.

Of course, the fifth sending means 107 in the assist control apparatus 10 in MS 1a can also send the precoding vector $v_{a,b}$ to BS 2a directly.

The sixth receiving means 206 in the control apparatus 20 in BS 2a receives from MS 1a the index of the precoding vector $v_{a,b}$ corresponding to the downlink signal from BS 2b to MS 1a and the seventh sending means 207 in the control apparatus 20 in BS 2a sends it to BS 2b.

In the meantime when MS 1a selects the precoding vector $v_{a,b}$ corresponding to the downlink signal from BS 2b to MS 1a from the shared codebook, MS 1b also selects the precoding vector $v_{b,a}$ corresponding to the downlink signal from BS 2a to MS 1b from the shared codebook.

More specifically, after the second sending means 203 in the control apparatus 20 in BS 2a sends to BS 2b the received index of the precoding $v_{a,a}$ corresponding to the downlink signal from BS 2a to MS 1a, the third receiving means 204 in the control apparatus 20 in BS 2b receives the index of the precoding vector $v_{a,a}$ corresponding to the downlink signal from BS 2a to MS 1a forwarded by BS 2a from MS 1a and the third sending means 205 in the control apparatus 20 sends the index of the precoding vector $v_{a,a}$ to MS 1b.

After the fifth receiving means 105 in the assist control apparatus 10 in MS 1b receives the index of the precoding vector $v_{a,a}$, based on the index of the precoding vector $v_{a,a}$ and the estimated channel transmission matrix $H_{b,a}$ of the downlink channel from BS 2a to MS 1b, the second selecting means 106 in the assist control apparatus 10 in MS 1b selects the precoding vector $v_{b,a}$ corresponding to the downlink signal from BS 2a to MS 1b from the shared codebook.

More specifically, firstly according to the received index of the precoding vector $v_{a,a}$ corresponding to the downlink signal from BS 2a to MS 1a, the second searching means in the second selecting means 106 in MS 1b searches the corresponding precoding vector $v_{a,a}$ from the shared codebook. Then according to the precoding vector $v_{a,a}$ corresponding to the downlink signal from BS 2a to MS 1a and the estimated channel transmission matrix $H_{b,a}$ of the downlink channel from BS 2a to MS 1b, the third selecting means in the second selecting means 106 selects the precoding vector $v_{b,a}$ corresponding to the downlink signal from BS 2a to MS 1b from the codebook.

Wherein, the selected precoding vector $v_{b,a}$ corresponding to the downlink signal from BS 2a to MS 1b from the shared codebook should be orthogonal with the selected precoding vector $v_{a,a}$ corresponding to the downlink signal from BS 2a to MS 1a.

Since each column of the precoding vectors in each precoding matrix in the shared codebook is orthogonal with each other, preferably, according to the estimated channel transmission matrix $H_{b,a}$ of the downlink channel from BS 2a to MS 1b, the second selecting means 106 in the assist control apparatus 10 in MS 1b selects the precoding vector $v_{b,a}$ corresponding to the downlink signal from BS 2a to MS 1b from the precoding matrix where the precoding vector $v_{a,a}$ corresponding to the downlink signal from BS 2a to MS 1a is located.

Further, selecting a precoding vector $v_{b,a}$ from a shared codebook by the second means 106 in the assist control apparatus 10 in MS 1b is based on the following formula:

$$v_{b,a} = \underset{\substack{c \in C \\ v_{a,a} \cdot c' = 0}}{\mathrm{argmax}} |H_{b,a} c|^2$$

Wherein, C represents codebook, c' represents the conjugate transposed matrix of c. The above formula represents that any column of precoding vector in the precoding matrix, where the precoding vector $v_{a,a}$ is located, in the codebook C, is traversed. The column of vector c which makes $|H_{b,a}c|^2$ reach the maximum value is the precoding vector $v_{b,a}$ corresponding to the downlink signal from BS 2a to MS 1b.

After the second selecting means 106 in the assist control apparatus 10 in MS 1b selects the precoding vector $v_{b,a}$ corresponding to the downlink signal from BS 2a to MS 1b from the shared codebook, the fifth sending means 107 in the assist control apparatus 10 in MS 1b sends the index of the selected precoding vector $v_{b,a}$ to BS 2b.

Of course, the fifth sending means 107 in the assist control apparatus 10 in MS 1b can also send the precoding vector $v_{b,a}$ to BS 2b directly.

After the sixth receiving means 206 in the control apparatus 20 in BS 2b receives from MS 1b the index of the precoding vector $v_{b,a}$ corresponding to the downlink signal from BS 2a to MS 1b, the seventh sending means 207 in the control apparatus 20 in BS 2b sends it to BS 2a.

The second receiving means 208 in the control apparatus 20 in BS 2a receives the index of the precoding vector $v_{b,a}$ corresponding to the downlink signal from BS 2a to MS 1b forwarded by BS 2b from MS 1b.

Next, based on the received index of the precoding vector $v_{b,a}$ corresponding to the downlink signal from BS 2a to MS 1b and the index of the precoding vector $v_{a,a}$ corresponding to the downlink signal from BS 2a to MS 1a, the first precoding means 209 in the control apparatus 20 in BS 2a precodes the downlink signals sent to MS 1a and MS 1b respectively.

More specifically, firstly, according to the received index of the precoding vector $v_{a,a}$ corresponding to the downlink signal from BS 2a to MS 1a, the first searching means in the first precoding means 209 in BS 2a searches the corresponding precoding vector $v_{a,a}$ from the shared codebook, and according to the received index of the precoding vector $v_{b,a}$ corresponding to the downlink signal from BS 2a to MS 1b, BS 2a searches the corresponding precoding vector $v_{b,a}$ from the shared codebook.

Then, according to the searched precoding vector $v_{a,a}$, the second precoding means in the first precoding means 209 in BS 2a precodes the downlink signal which is sent by BS 2a to MS 1a, and according to the searched precoding vector $v_{b,a}$, the second precoding means in the first precoding means 209 in BS 2a precodes the downlink signal which is sent by BS 2a to MS 1b.

At last, BS 2a sends the precoded downlink signals to MS 1a and MS 1b respectively.

Similarly, after the second receiving means 208 in the control apparatus 20 in BS 2b receives the index of the precoding vector $v_{a,b}$ corresponding to the downlink signal from BS 2b to MS 1a forwarded by BS 2a from MS 1a, based on the received index of the precoding vector $v_{b,a}$ corresponding to the downlink signal from BS 2a to MS 1b and the index of the precoding vector $v_{b,b}$ corresponding to the downlink signal from BS 2b to MS 1b, the first precoding means 209 in the control apparatus 20 in BS 2b precodes the downlink signals sent to MS 1b and MS 1a respectively.

More specifically, firstly, according to the received index of the precoding vector $v_{b,b}$ corresponding to the downlink signal from BS 2b to MS 1b, the first searching means in the precoding means 209 in BS 2b searches the corresponding precoding vector $v_{b,b}$ from the shared codebook, and according to the received index of the precoding vector $v_{a,b}$ corresponding to the downlink signal from BS 2b to MS 1a, BS 2b searches the corresponding precoding vector $v_{a,b}$ from the shared codebook.

Then, according to the searched precoding vector $v_{b,b}$, the second precoding means in the first precoding means 209 in BS 2b precodes the downlink signal which is sent by BS 2b to MS 1b, and according to the searched precoding vector $v_{a,b}$, the second precoding means in the first precoding means 209 in BS 2b precodes the downlink signal which is sent by BS 2b to MS 1a.

At last, BS 2b sends the precoded downlink signals to MS 1b and MS 1a respectively.

The concrete embodiments of the present invention have been described above. It is understandable, that the present invention is not ted to the specific embodiments mentioned above. Those skilled in the art nay perform various variation or modification in the protection scope of the claims.

The invention claimed is:

1. A method of controlling co-channel interference in a base station of a wireless communication system based on collaborative MIMO, wherein the method comprises:
   a. sending a downlink reference signal to a served mobile station and at least one coordinating mobile station;
   b. receiving precoding information corresponding to a downlink signal from the base station to the served mobile station from the served mobile station;
   c. sending the received precoding information to at least one other serving base station of the at least one coordinating mobile station;
   d. receiving at least one precoding information corresponding to at least one downlink signal from the base station to the at least one coordinating mobile station respectively forwarded by at least one other serving base station of the at least one coordinating mobile station from the at least one coordinating mobile station;

e. precoding a downlink signal from the base station to the served mobile station based on the precoding information corresponding to a downlink signal from the base station to the served mobile station, and precoding the at least one downlink signal from the base station to the at least one coordinating mobile station respectively based on the at least one precoding information corresponding to the at least one downlink signal from the base station to the at least one coordinating mobile station;

wherein, between (b) and (e), the method comprises:

m. receiving at least one precoding information corresponding to at least one precoding information of at least one downlink signal from the at least one other serving base station to the at least one coordinating mobile station respectively forwarded by at least one serving base station of the at least one coordinating mobile station from the at least one coordinating mobile station;

n. sending the received at least one precoding information to the served mobile station;

o. receiving at least one precoding information corresponding to at least one downlink signal from at least one other serving base station of the at least one coordinating mobile station to the served mobile station;

p. sending the received at least one precoding information to at least one other serving base station of the at least one coordinating mobile station respectively.

2. A method according to claim 1, wherein the precoding information is a precoding vector or an index of a precoding vector.

3. A method according to claim 2, wherein when the precoding information is an index of a precoding vector, (e) further comprises:

e1. according to the received index of a precoding vector corresponding to a downlink signal from the base station to the served mobile station, searching corresponding precoding vector from a shared codebook, and according to the received index of at least one precoding vector corresponding to at least one downlink signal from the base station to the at least one coordinating mobile station, searching corresponding at least one precoding vector from the shared codebook;

e2. according to the searched precoding vector corresponding to a downlink signal from the base station to the served mobile station, precoding a downlink signal from the base station to the served mobile station, and according to the searched at least one precoding vector corresponding to at least one downlink signal from the base station to the at least one coordinating mobile station, precoding at least one downlink signal from the base station to the at least one coordinating mobile station.

4. A method of assisting a serving base station to control co-channel interference in a mobile station of a wireless communication system based on collaborative MIMO, wherein the method comprises:

A. receiving a downlink reference signal from a serving base station and at least one downlink reference signal from at least one coordinating base station;

B. according to the received downlink reference signal from the serving base station, estimating a channel transmission matrix of a downlink channel from the serving base station to the mobile station, and according to the received at least one downlink reference signal from the at least one coordinating base station, estimating at least one channel transmission matrix of at least one downlink channel from the at least one coordinating base station to the mobile station respectively;

C. according to the estimated channel transmission matrix of a downlink channel from the serving base station to the mobile station, selecting a precoding vector corresponding to a downlink signal from the serving base station to the mobile station from a shared codebook;

D. sending precoding information corresponding to a downlink signal from the serving base station to the mobile station to the serving base station;

E. receiving at least one precoding information corresponding to at least one downlink signal from the at least one coordinating base station to at least one served mobile station of the at least one coordinating base station forwarded by the at least one coordinating base station and the serving base station of the at least one served mobile station from the at least one coordinating base station;

F. based on the received at least one precoding information and the estimated at least one channel transmission matrix of at least one downlink channel from the at least one coordinating base station to the mobile station, selecting at least one precoding vector corresponding to at least one downlink signal from at least one coordinating base station to the mobile station from the shared codebook respectively; wherein the precoding vector corresponding to a downlink signal from each coordinating base station to the mobile station is orthogonal with the precoding vector corresponding to a downlink signal from the coordinating base station to the served mobile station of the coordinating base station;

G. sending at least one precoding information corresponding to at least one downlink signal from the at least one coordinating base station to the mobile station to the serving base station.

5. A method according to claim 4, wherein the precoding information is a precoding vector or an index of a precoding vector.

6. A method according to claim 5, wherein the precoding information is an index of a precoding vector, and wherein (D) further comprises:

D1. according to the selected precoding vector corresponding to a downlink signal from the serving base station to the mobile station, determining an index of the precoding vector;

D2. sending the determined index of the precoding vector corresponding to a downlink signal from the serving base station to the mobile station to the serving base station.

7. A method according to claim 5, wherein the precoding information is an index of a precoding vector, and wherein (F) further comprises:

F1. according to the received index of at least one precoding vector corresponding to at least one downlink signal from the at least one coordinating base station to at least one served mobile station of the at least one coordinating base station, searching corresponding at least one precoding vector from the shared codebook;

F2. according to the searched at least one precoding vector and the estimated at least one channel transmission matrix of at least one downlink channel from the at least one coordinating base station to the mobile station, selecting at least one precoding vector corresponding to at least one downlink signal from at least one coordinating base station to the mobile station from the shared codebook respectively; wherein the precoding vector corresponding to a downlink signal from each coordinating base station to the mobile station is orthogonal with the precoding vector corresponding to a downlink signal from the coordinating base station to the served mobile station of the coordinating base station.

8. A control apparatus of controlling co-channel interference in a base station of a wireless communication system based on collaborative MIMO, wherein the apparatus comprises:
- a first transmitter, for sending a downlink reference signal to a served mobile station and at least one coordinating mobile station;
- a first receiver, for receiving precoding information corresponding to a downlink signal from the base station to the served mobile station from the served mobile station;
- a second transmitter, for sending the received precoding information to at least one other serving base station of the at least one coordinating mobile station;
- a second receiver, for receiving at least one precoding information corresponding to at least one downlink signal from the base station to the at least one coordinating mobile station respectively forwarded by at least one other serving base station of the at least one coordinating mobile station from the at least one coordinating mobile station;
- a first precoder, for precoding a downlink signal from the base station to the served mobile station based on the precoding information corresponding to a downlink signal from the base station to the served mobile station, and precoding the at least one downlink signal from the base station to the at least one coordinating mobile station respectively based on the at least one precoding information corresponding to the at least one downlink signal from the base station to the at least one coordinating mobile station;

wherein, the control apparatus further includes:
- a third receiver, for receiving at least one precoding information corresponding to at least one precoding information of at least one downlink signal from the at least one serving base station to the at least one coordinating mobile station respectively forwarded by at least one other serving base station of the at least one coordinating mobile station from the at least one coordinating mobile station;
- a third transmitter, for sending the received at least one precoding information to the served mobile station;
- a sixth receiver, for receiving at least one precoding information corresponding to at least one downlink signal from at least one other serving base station of the at least one coordinating mobile station to the served mobile station;
- a seventh transmitter, for sending the received at least one precoding information to at least one other serving base station of the at least one coordinating mobile station respectively.

9. A control apparatus according to claim 8, wherein the precoding information is a precoding vector or an index of a precoding vector.

10. A control apparatus according to claim 9, wherein when the precoding information is an index of a precoding vector, the first precoding module includes:
- a first searching module, for according to the received index of a precoding vector corresponding to a downlink signal from the base station to the served mobile station, searching corresponding precoding vector from a shared codebook, and according to the received index of at least one precoding vector corresponding to at least one downlink signal from the base station to the at least one coordinating mobile, searching corresponding at least one precoding vector from the shared codebook;
- a second precoder, for according to the searched precoding vector corresponding to a downlink signal from the base station to the served mobile station, precoding a downlink signal from the base station to the served mobile station, and according to the searched at least one precoding vector corresponding to at least one downlink signal from the base station to the at least one coordinating mobile station, precoding at least one downlink signal from the base station to the at least one coordinating mobile station.

11. An assist control apparatus of assisting a serving base station to control co-channel interference in a mobile station of a wireless communication system based on collaborative MIMO, wherein the assist control apparatus comprises:
- a fourth receiver, for receiving a downlink reference signal from a serving base station and at least one downlink reference signal from at least one coordinating base station;
- an estimator, for according to the received downlink reference signal from the serving base station, estimating a channel transmission matrix of a downlink channel from the serving base station to the mobile station, and according to the received at least one downlink reference signal from the at least one coordinating base stations, estimating at least one channel transmission matrix of at least one downlink channel from the at least one coordinating base stations to the mobile station respectively;
- a first selecting module, for according to the estimated channel transmission matrix of a downlink channel from the serving base station to the mobile station, selecting a precoding vector corresponding to a downlink signal from the serving base station to the mobile station from a shared codebook;
- a fourth transmitter, for sending precoding information corresponding to a downlink signal from the serving base station to the mobile station to the serving base station;
- a fifth receiver, for receiving at least one precoding information corresponding to at least one downlink signal from the at least one coordinating base station to at least one served mobile station of the at least one coordinating base station forwarded by the at least one coordinating base station and the serving base station from the at least one served mobile station from the at least one coordinating base station;
- a second selecting module, for based on the received at least one precoding information and the estimated at least one channel transmission matrix of at least one downlink channel from the at least one coordinating base station to the mobile station, selecting at least one precoding vector corresponding to at least one downlink signal from at least one coordinating base stations to the mobile station from the shared codebook respectively; wherein the precoding vector corresponding to a downlink signal from each coordinating base station to the mobile station is orthogonal with the precoding vector corresponding to a downlink signal from the coordinating base station to the served mobile station of the coordinating base station;
- a fifth transmitter, for sending at least one precoding information corresponding to at least one downlink signal from the at least one coordinating base station to the mobile station to the serving base station.

12. An assist control apparatus according to claim 11, wherein the precoding information is a precoding vector or an index of a precoding vector.

13. An assist control apparatus according to claim 12, wherein the precoding information is an index of a precoding vector, the fourth transmitter further includes:

a determining module, for according to the selected precoding vector corresponding to a downlink signal from the serving base station to the mobile station, determining an index of the precoding vector;

a sixth transmitter, for sending the determined index of the precoding vector corresponding to a downlink signal from the serving base station to the mobile station to the serving base station.

14. An assist control apparatus according to claim 12, wherein the precoding information is an index of a precoding vector, the second selecting module further includes:

a second searching module, for according to the received index of at least one precoding vector corresponding to at least one downlink signal from the at least one coordinating base station to at least one served mobile station of the at least one coordinating base station, searching corresponding at least one precoding vector from the shared codebook;

a third selecting module, for according to the searched at least one precoding vector and the estimated at least one channel transmission matrix of at least one downlink channel from the at least one coordinating base station to the mobile station, selecting at least one precoding vector corresponding to at least one downlink signal from at least one coordinating base station to the mobile station from the shared codebook respectively; wherein the preceding vector corresponding to a downlink signal from each coordinating base station to the mobile station is orthogonal with the precoding vector corresponding to a downlink signal from the coordinating base station to the served mobile station of the coordinating base station.

* * * * *